United States Patent [19]

Hanig

[11] Patent Number: 4,477,511

[45] Date of Patent: Oct. 16, 1984

[54] METHOD FOR PRODUCING ARTISTIC DESIGNS ON THIN LAYER CHROMATOGRAPHY PLATES AND PRODUCT

[75] Inventor: Richard E. Hanig, Gaithersburg, Md.

[73] Assignee: Ronia Garnicki, Silver Spring, Md.

[21] Appl. No.: 418,206

[22] Filed: Sep. 15, 1982

[51] Int. Cl.[3] .......................... B32B 3/18; B05D 1/36

[52] U.S. Cl. ................................ 428/201; 210/198.3; 427/261; 427/262; 427/263; 428/195; 428/204; 428/206; 428/207

[58] Field of Search ..................... 210/198.3; 428/195, 428/201, 38, 204, 207, 206; 427/261, 262, 263

[56] References Cited

U.S. PATENT DOCUMENTS

| | | | |
|---|---|---|---|
| 1,413,429 | 4/1922 | Robson | 427/262 |
| 3,502,217 | 3/1970 | Bruckner et al. | 210/198.3 |
| 3,644,734 | 2/1972 | Inoue et al. | 210/198.3 X |
| 3,914,174 | 10/1975 | Fuchs | 210/198.3 |
| 4,217,378 | 8/1980 | Pizur | 428/38 X |
| 4,378,387 | 3/1983 | Mitchell | 427/263 |

*Primary Examiner*—Thomas J. Herbert
*Attorney, Agent, or Firm*—Wegner & Bretschneider

[57] ABSTRACT

A method of producing artistic effects on thin layer chromatography plates is shown and described. The method includes the use of color sources placed on the plates with a reservoir source of solvent placed upon the top of the color source. A produce which is a decorative thin layer chromatography plate covered with a protective coating is also shown and described.

22 Claims, 2 Drawing Figures

METHOD FOR PRODUCING ARTISTIC DESIGNS ON THIN LAYER CHROMATOGRAPHY PLATES AND PRODUCT

BACKGROUND OF THE INVENTION

1. Field of the Invention

This invention relates to a method for producing artistic effects on flat glass surfaces, or other surfaces such as plastic, and a product which is an attractive artistic series of color gradations. More particularly this invention contemplates the placement of colored material upon chromatographic plates which are plates used for the separation of materials that are placed upon a body of absorbant material which is affixed to a glass plate.

2. Description of the Prior Art

The prior art as understood by the applicant covers the art of decorating on glass and the art of forming artistic effects by chemical processes or diffusion of dye stuffs into a material.

In the field of decorating on glass: U.S. Pat. No. 4,217,378 discloses a process which requires pressing a sheet of flexible film on a coating until it dries; U.S. Pat. No. 1,942,787 describes a process where colors are worked on the surface of a transparent plate in order to simulate marble; and U.S. Pat. No. 2,757,473 shows a multi-layered technique for producing decorative effects on glass.

In the field of processing chemicals and diffusion, U.S. Pat. No. 1,579,872 shows a process where two agents react chemically as distinguished from a mere disolving effect, to spread or draw the color over the paper and thereby vary the color distribution over the portions or the paper wet by the two agents; U.S. Pat. No. 3,368,912 relates to a decorative crystalization process which uses an aqueous solution containing sodium barbital and a gel forming substance and having a pH between 5.5 and 9.0; and U.S. Pat. No. 396,116 describes a process for producing decorative designs which depends upon hop infusion to immediately act to break up or rupture the acidulated pigment at such points as may be suitable for production of the decorative effect.

In the field of chromatographic plate manufacture, U.S. Pat. No. 3,502,217 describes an abrasion resistant plate which may be used with this invention. U.S. Pat. No. 2,524,414 describes a method of separating and analyzing water-soluble polyfunctional materials such as the carbohydrates and related substances by selective absorption. U.S. Pat. No. 4,138,336 describes a type of chromatographic plate which is constructed of a metal oxide bonded to the substrate by an inorganic metal oxide binder. The above patents which relate to chromatographic plate techniques describe plates which may be used with the invention herein described.

SUMMARY OF THE INVENTION

1. Brief Description

This invention relates to the process for and the manufacture of decorative artistic effects upon chromatographic plates of the type set for th in U.S. Pat. No. 3,502,217. By placement of a plurality of sources of color on a plate and slowly washing the colors into and across a chromatographic plate a decorative design may be produced.

2. Objects and advantages of the invention

An object of this invention is to provide a method for producing decorative and artistic effects upon a glass plate easily and without artistic training, experience or skill.

Another object is to produce a unique artistic series of color shades and variations upon a sheet of glass which will be an attractive and interesting object to look at.

Another object is the creation of artistic effects by the use of available chromatographic plates with sources of color and reservoirs of fluid to cause dispersion of the colors on the plate.

Another object is the production of artistic appearing translucent chromatographic plates.

These together with other objects and advantages which will become subsequently apparent reside in the details of construction and operation of the method which produces the artistic product as are more fully hereinafter described, claimed, and shown in the photographs of plates.

BRIEF DESCRIPTION OF THE DRAWINGS

The drawings included with this application are black and white photographs of chromatographic plates with decorative designs placed thereon in accordance with this invention.

DETAILED DESCRIPTION OF THE PREFERRED EMBODIMENT

Figure 1:
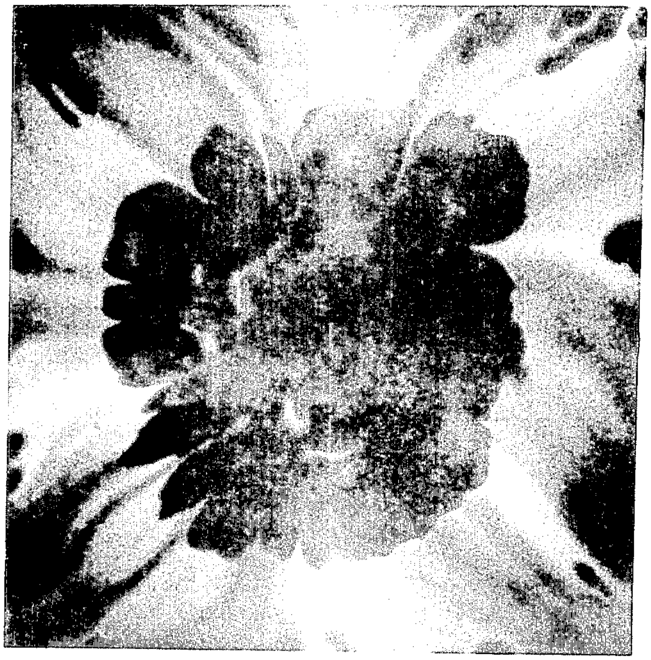
FIG. 1 shows a plate made with a single source of colors and a single solvent reservoir placed in the center of the plate.

The invention is a decorative and artistic object which is made from a chromatographic plate by a method which is also a part of the invention.

In the preferred embodiment, a chromatographic plate of the type described in U.S. Pat. No. 3,502,217, Bruckner et. al. This plate is abrasion resistant which is a desirable property for plates which are to be used for production of artistic designs in accordance with this invention. If a plate which is not abrasion resistant is used, there may be a problem with the scratching or marring of the surface during ordinary course of handling and packing that art work can be expected to experience. When an abrasion resistant plate is used, it may also be desirable to spray the completed plate with a coating for further protection. If the plate is not abrasion resistant, then it must be sprayed for protection.

The Chromatographic plate as set forth in U.S. Pat. No. 3,502,217 are known as thin layer chromatography (TLC) plates. In the process of this invention, a source of color is applied to the TLC plate. The source of color can be a paper, a cloth, a sponge or other similar material which can be folded, or crumpled, or cut into a design. The source is then pre-wetted and stained with colored inks or dyestuffs. Next the prepared source is applied to the TLC plate and a solvent reservoir which may be made up or wet coffee grinds, wet saw dust, or wet cotton is placed on top of the source. The reservoir may also be wrapped around by the source so that the fluid emerges from within. The solvent washes the dyestuff or ink onto the TLC plate and the flow pattern follows along the fold lines in the color source producing a color pattern that diffuses outward towards the edge of the TLC plate.

Small amounts of solvent can be added to the solvent reservoir to aid in forcing the pattern to the edge of the TLC plate. Still further, small amounts of color can be added to the reservoir for a background color or added later to bleed color into an already formed pattern.

When most of the solvent has evaporated, the plate is turned upside down and the reservoir and color source is removed from the plate. The plate is then allowed to dry. Once the TLC plate is dry, it can be sprayed with a protective coating.

The developed patterns will vary as a function of the type of TLC plate preparation used. It has been found that TLC plates of alumina gel, silica gel, or cellulose gel are suitable. The pattern developed will vary depending upon the shape of the color source, placement of the colors and the solvents used. Solvents may be alcohol, water, or any other suitable solvent which is compatible with the TLC plate used.

The pattern will also vary according to the pH of the solvent with respect to the pH of the TLC plate. The pH effect is seen at the edge of the pattern.

The plates will be translucent depending on the strength of the color source. The plate and the pattern will glow in ultraviolet light depending upon the dye stuff material which is selected.

The pattern can be effected by placing just a colorless solvent reservoir in different positions. This technique leaves open white areas on the TLC plate.

The pattern can be varied as a function of the number of sources and the type of solvent reservoirs which are placed upon the plate.

The patterns formed will have many attractive gradations of color due to the mixing of the color and the overloading of the chromatographic medium. Overloading results in only partial separation out of different dyestuffs and effectively blends them into various color fields.

In FIG. 1 there is shown an example of a pattern developed upon a TLC plate with a single source and reservoir placed in the center. In this example a TLC plate of the type shown in U.S. Pat. No. 3,502,217 was used. This type of pattern can be developed using a dyed crumpled piece of paper as the color source.

Figure 2:
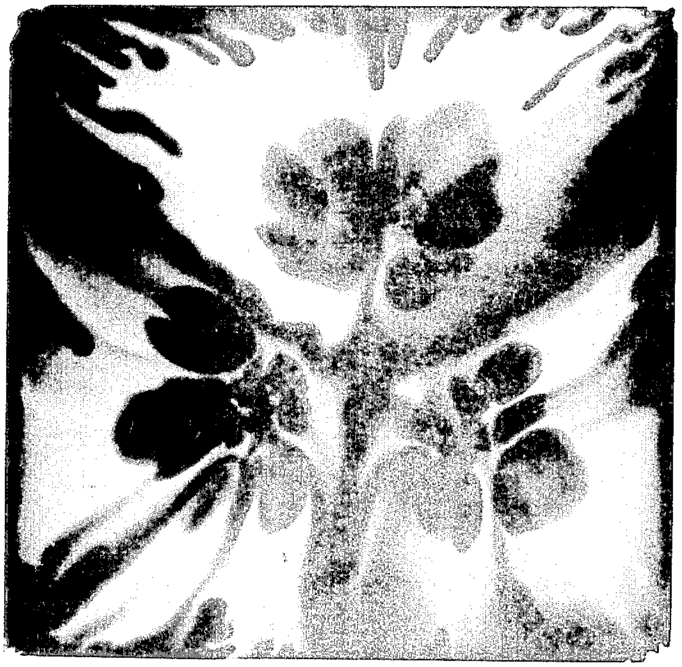
FIG. 2 shows a plate made with three sources spaced at approximately 120 degrees from each other and at the center of the plate.

In FIG. 2 there is shown a pattern produced by three separate color sources which were placed at approximately 120 degrees from each other. As can be seen from this example, many different and creative patterns are obtainable by the use of multiple sources of color.

An example of the use of the method of this invention is as follows:

a filter paper, normally used in percolator coffee pots is folded and crumpled with wet coffee grounds placed in the middle of the paper. The paper is crumpled around the grounds;

the paper is then wet with washable black ink, which contains the elements of blue, green, and red, the quantity of ink is aproximately two millileters;

at this point a small amount of red ink is also applied, the type of TLC plate chosen in this case is an E. Merck aluminum oxide (type T);

the source of color and solvent reservoir are then applied to the TLC plate;

small amounts of solvent are added to the reservoir as needed;

after waiting approximately 20 minutes, the pattern will develop, the plate is then turned upside down and the color source and reservoir are removed; and a protective coating is applied to the TLC plate.

Another example of the use of the method of this invention is as follows:

crepe paper of different colors is crumpled together on a Baker-flex (PEI-F) plastic sheet TLC plate;

water soaked cotton is then used as the solvent reservoir and is put on top of the crepe paper; and after 15 minutes the plastic is turned over and the source and reservoir are removed.

The product produced by the above described method and process will be an attractive decorative artistic article which has a dyestuff design placed therein, and a protective coating. Dependant upon the choice of dyestuff and plates, the product may be translucent with back lighting and/or produce a glowing effect when it receives ultraviolet light.

From the foregoing description of the method and process of this invention, one skilled in the art can easily ascertain the essential features of the method and product of this invention, and can without departing from the spirit and scope of this invention make various changes and modifications to adapt it to various usages and conditions. Such changes and modifications are intended to be within the scope of the appended claims.

What is claimed is:

1. A decorative artistic article comprising;

a chromatographic plate having a dyestuff design placed thereon in an irregular pattern by placing a pattern producing color source having folds which form a pattern and solvent reservoir upon said plate and removing said pattern producing color source and solvent reservoir when said pattern has developed through the intermixing of the solvent and the color source to a suitable decorative or artistic state, and wherein said solvent reservoir is a liquid absorbent material which holds said solvent and said reservoir is selected from the group of coffee grinds, with saw dust and cotton.

2. The article of claim 1 further including a protective coating placed over said chromatographic plate.

3. The article of claim 1 wherein said chromatographic plate is of the abrasion resistant type.

4. The article of claim 1 wherein said dyestuff includes a plurality of colors.

5. The article of claim 1 wherein said plate is translucent.

6. The article of claim 1 wherein said dyestuff will glow when it receives ultraviolet light.

7. A method for producing decorative and artistic patterns on a chromatographic plate comprising the following steps;

placing a pattern producing color source on said chromatiographic plate, said source having folds which form a pattern, placing a solvent reservoir of solvent on top of said source, wherein said solvent reservoir is a liquid absorbent material which holds said solvent and said reservoir is selected from the group of coffee grinds, with saw dust and cotton, and removing said source and solvent reservoir when said pattern has developed through the intermixing of the solvent and the color sources to a suitable decorative or artistic state.

8. The method of claim 1 wherein said thin chromatographic plate is composed of materials selected from the group of alumina gel, silica gel, and cellulose gel.

9. The method of claim 1 further including the step of placing colorless solvent reservoirs at different locations on said plate.

10. The method of claim 1 further including the step of placing a plurality of color sources and reservoirs upon said plate.

11. The method of claim 1 wherein said source includes a dyestuff which has a plurality of dyes which have different rates of absorbancy upon the chromatographic plate.

12. The method of claim 1 wherein said color source includes a dyestuff.

13. The method of claim 1 further including the step of applying color to the solvent reservoir source of solvent.

14. The method of claim 1 further including the step of spraying said chromatographic plate with a protective coating after the source and reservoir have been removed and the plate has dried.

15. A method for producing decorative and artistic patterns on a chromatographic plate comprising the steps of:

preparing a combined pattern producing color source having folds which form a pattern and solvent reservoir, placing said combined pattern producing source and solvent reservoir on said chromatographic plate, removing said combined pattern producing color source and solvent reservoir when said pattern has developed though the intermixing of the solvent and the color source to a suitable decorative or artistic state, and wherein said solvent reservoir is a liquid absorbent material which holds said solvent and said reservoir is selected from the group of coffee grinds, with saw dust and cotton.

16. The method of claim 15 wherein said color source includes a dyestuff.

17. The method of claim 15 further including the step of applying color to the solvent reservoir source of solvent.

18. The method of claim 15 further including the step of spraying said chromatographic plate with a protective coating after the source and reservoir have been removed and the plate has dried.

19. The method of claim 15 wherein said thin chromatographic plate is coated with materials selected from the group of alumina gel, silica gel, and cellulose gel.

20. The method of claim 15 further including the step of placing colorless solvent reservoirs at different locations on said plate.

21. The method of claim 15 further including the step of placing a plurality of color sources and reservoirs upon said plate.

22. The method of claim 15 wherein said source includes a dyestuff which has a plurality of dyes which have different rates of absorbancy upon the chromatographic plate.

* * * * *